United States Patent [19]

Taylor

[11] 4,129,283

[45] Dec. 12, 1978

[54] ACTUATOR

[76] Inventor: Joseph W. Taylor, P.O. Box 40509, Houston, Tex. 77040

[21] Appl. No.: 738,564

[22] Filed: Nov. 3, 1976

Related U.S. Application Data

[63] Continuation of Ser. No. 598,355, Jul. 23, 1975, abandoned, which is a continuation of Ser. No. 511,983, Oct. 4, 1974, abandoned.

[51] Int. Cl.² ........................................... F16K 31/122
[52] U.S. Cl. .................................... 251/62; 251/214; 251/282
[58] Field of Search ................. 251/14, 62, 63.5, 63.6, 251/282, 214, 63

[56] References Cited

U.S. PATENT DOCUMENTS

| | | | |
|---|---|---|---|
| 2,897,836 | 8/1959 | Peters et al. | 251/282 |
| 2,931,616 | 4/1960 | White et al. | 251/282 |
| 3,095,176 | 6/1963 | Hunt | 251/62 |
| 3,331,583 | 7/1967 | Baker | 251/282 |
| 3,379,405 | 4/1968 | Natho | 251/63.6 |
| 3,385,561 | 5/1968 | Whalen | 251/282 |
| 3,410,518 | 11/1968 | Carsten | 251/62 |
| 3,770,247 | 11/1973 | Nelson | 251/282 |
| 4,016,716 | 4/1977 | Evans et al. | 251/62 |

*Primary Examiner*—Martin P. Schwadron
*Assistant Examiner*—G. L. Walton
*Attorney, Agent, or Firm*—Robert W. B. Dickerson

[57] ABSTRACT

A gate valve operator having dual pistons, one having pilot pressure acting thereagainst thereby tending to open the valve, and one having line pressure acting thereagainst tending to close the valve. The line pressure piston's pressure surface area may be varied to compensate for wells having depleted pressure, and line pressure at all times tends to close the valve, i.e., the actuator is unbalanced.

4 Claims, 1 Drawing Figure

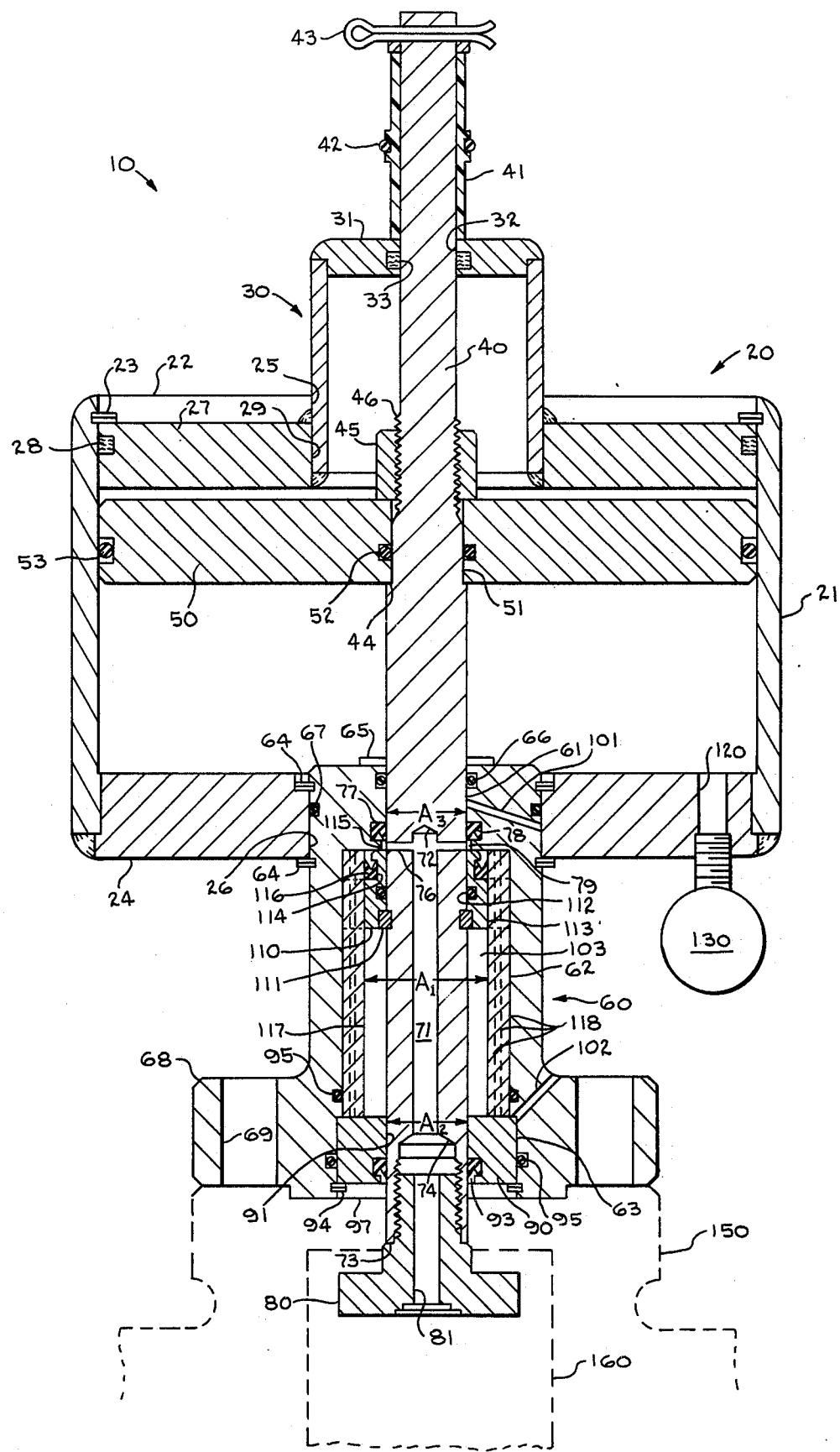

ACTUATOR

This application is a continuation of Ser. No. 598,355 filed July 23, 1975, now abandoned, and it in turn a continuation of Ser. No. 511,983 filed Oct. 4, 1974, now abandoned.

BACKGROUND OF THE INVENTION

Gate valves have long been used to control the flow of fluids through conduits having fluids passing therethrough. Examples include those shown by U.S. Pat. Nos. 3,029,060 and 3,770,247. Such valves include an apertured gate. The gate is caused to move, generally perpendicular to the direction of throughput flow. Such gates may be direct or reverse acting. Subsequently, actuators were developed, oftentimes using independent sources of power, such as pressurized gas, to effect such alignment and misalignment. Inasmuch as closing is absolutely necessary, in the event of line breaks, actuator-power failure, or the like, fail safe systems were desirable. Of late, governmental regulatory bodies have required such fail safe systems, for ecological protection purposes. Three particular problems have remained, namely, (1.) the desirability of an actuator being compatible with standard direct acting gates, (2.) the desirability of an actuator continuing to be functional where normal line pressure decreases with depletion of well pressure from which such line is supplied, and (3.) the necessity of causing the valve to close in the absence of pilot pressure. It was to solve such problems that this invention was directed.

SUMMARY OF THE INVENTION

A pilot pressure power cylinder is linked in a non-pressure-communicating manner, with a line pressure bonnet. A stem passes through such cylinder and bonnet, and has separate pistons attached thereto, such pistons being reciprocatingly positioned within said cylinder and bonnet. Means are provided for outside pilot pressure to act against one piston, tending to open the gate valve. Means are further provided for directing line pressure against the other of said piston, tending to cause valve closure. This use of line pressure results in a so-called unbalanced system, unlike so-called balanced systems such as shown by U.S. Pat. Nos. 2,897,836 and 3,331,583. Finally means are provided for effectively varying the area of said latter mentioned piston not only so that the effective force thereagainst may remain relatively constant in spite of decreased line pressure during the natural depletion of the sources, such as wells, supplying such line, but also to establish a "closing" bias that may be overcome by pilot fluid within the limits of available pilot pressure. Such bonnet, with its force varying means, would have utility with other systems, such as manually operable, rotatable stems.

DESCRIPTION OF THE DRAWINGS

A vertical section through the invention showing the piston in gate valve-opening position, the piston stem being connected to the gate of a gate valve.

DESCRIPTION OF THE INVENTION

The actuator of this invention is generally illustrated by the numberal 10. Centrally disposed thereof is a piston cylinder generally shown at 20. Such cylinder includes bell housing 21, the interior of which may be coated with Teflon, upper end cap 22 fitted to the housing by snap rings 23, and lower end cap 24, which may be welded, or otherwise affixed to member 21. Both end caps 22, 24 include central bores therethrough, at 25, 26 respectively. Cylindrical, centrally apertured, plate 27 is illustrated to be closely fitted within housing 21, adjacent end cap 22, for support of a housing hood 30. Such plate includes a fluid, but non-pressure tight, seal 28 around its outer periphery, as well as a bore 29, centrally therethrough.

Partially inserted within cylinder 20, and extending substantially through bores 25, 29, and affixed, as by welding, to end cap 22 and plate 27, is hood 30. Such hood is shown to be open at one end, with an end cap 31 at the other, said cap being centrally bored at 32. Bore 32 also includes an annular fluid seal 33 therearound.

Reciprocatingly extending within cylinder 20 hood 30, bonnet 60 and adapter 90, is stem 40. Toward the upper end of stem 40, a cylindrical sleeve 41 is shown to encircle the stem, and be fixed thereto. An annular member 42 may clampingly encircle said sleeve, and be fixed, as by a chain (not shown), to the head of cotter pin 43. This cotter pin extends through a horizontal aperture near said upper end of the stem. Members 41, 42 and 43 serve a special purpose, not specifically linked to the main purposes of this invention. For example, in use in areas where dangerously high temperatures may occur, sleeve 41, combustible at a relatively low temperature would, in the absence of high temperatures, limit downward stem movement. On combustion occurring, or at temperatures high enough to melt sleeve 41, further downward stem movement would be permitted. Such movement may be used to cause valve closure signal or the like.

Moving back to the primary function of this invention, annular piston 50 is centrally bored at 51, includes an O-ring static pressure seal 52 around a recess in such bore, and is fixed to stem 40 by resting on stem shoulder 44 and being clamped thereagainst by nut 45 which mates with counter-part threads 46 on the stem. Around the outer periphery of piston 50, a dynamic pressure seal 53 is positioned within an annular groove provided therefore.

Moving ever downwardly, fixedly positioned within cylinder bore 26 is one end of cylindrical bonnet 60. This bonnet includes central bore 61, first counter-bore 62 and second counter-bore 63, the totality of such bores extending axially and continuously through the bonnet. Means for fixing the bonnet to the end cap 24 of cylinder 20 are provided in the form of snap rings 64. One or more loosely fitting washers or spacers 65 may encircle stem 40, and rest atop the upper portion of bonnet 60, to serve as an adjustable stop for piston 50. O-ring dynamic pressure seal 66 is positioned within a bonnet groove provided therefore, and slidably and sealingly engages reciprocating stem 40. A further O-ring static seal 67 is positioned within an outer bonnet groove for pressure sealing purposes intermediate said bonnet and the wall of end cap bore 26. At the lower end of bonnet 60, there is an outwardly extending flange 68, which flange includes spaced lug or bolt holes 69, to permit affixing this actuator to a valve housing, such as illustrated generally by 150.

Stem 40 includes axially centered bore 71 extending downwardly from terminal end 72 to communicatingly merge with counter-bored portion 74 near open end 73 of the stem. The stems open end is joined with exteriorly threaded T-head plug 80, whose threads mate with female threads provided the wall of counterbore 74.

This T-head plug may join and be fixed to most gate valve gates, such as 160, in a standard manner. Such plug is also axially centrally bored at 81, throughout the plugs length. One end of such plug bore 81 is in communication with stem counterbore 74, and therefore with stem bore 71, and the other end of plug bore 81 in communication with line pressure in the valve body.

Closely adjacent terminal end 72 of stem bore 71, a plurality of apertures 76 extend radially from said bore, exteriorly of the stem 40, to be in communication with the space exterior of the stem. Annular seal-receiving recess 77 is provided in the wall of bonnet bore 61, to receive annular cup seal 78. This seal, would also be a dynamic pressure seal, and preferably would be of a low coefficient of friction material, such as Teflon. Recess 77 is shown to be in fluid communication with the interior cavity formed by counter-bore 62, by virtue of annular passageway 79.

A similar seal-receiving recess 92 has positioned therein a like cup seal 93, at interior bore 91 of adapter 90. Said adapter is fitted within counter-bore 63 of bonnet 60, and fixed to said bonnet by snap rings 94 and centrally apertured closure member 97. O-ring static seals 95 are strategically placed within annular grooves 96 provided within the walls adjacent 1st and 2nd counterbores 62, 63 respectively.

Vent passages 101 and 102 are provided through a wall of bonnet 60. Vent 101 leads from interior of bonnet bore 61, from a position intermediate seals 66 and 78, to vent to atmosphere, and thus prevents any pressure build up intermediate the seals, which may result from leakage. Vent 102 vents the interior cavity 103, between the wall of counterbore 62, stem 40 and the undersurface of piston 110, to atmosphere. Annular piston 110 is fixed to the exterior of stem 40, by shoulder ring 111, and has O-ring static seal 112 positioned within an annular recess provided in the body 113 of said piston.

Both solid line and phantom line positions of piston body 113 are shown. Piston shank 114, having shoulder 115, extends upwardly of said body, and includes Teflon, or like material, cup seal 116 intermediate said piston shank and the inner wall of counter-bore 62. Also, both solid, 117, and phantom, 118, line positions are shown to represent the interior wall of counter-bore 62. The purpose of such diversity is to illustrate the point that the outer diameter of piston 110 may be varied, i.e., one may be replaced with another of varying diameter, and conjointly, the effective internal diameter of counter-bore 62 may be varied by the insertion of cylindrical sleeves therein. The process of varying such internal diameter may include the substitution of a single sleeve having a wall of a different thickness, or the insertation or removal of a plurality of relatively thin walled sleeves, of varying outer diameter, with one nesting within an outer one. In any case, the piston O.D. would match the counter-bore (actually the sleeve) I.D.

A source of pilot gas, or other fluid (not shown), would enter entry port 120 provided through lower end cap 24. If desired, though not necessary to this invention, a high and/or low pressure pilot safety control 130 may be positioned intermediate the pilot source and entry port 120.

OPERATION OF THE INVENTION

Assume that flange 68 of bonnet 60 is affixed to a gate valve housing 150, and that T-plug or fitting 80 is affixed to the direct acting gate 160 of such valve, with line pressure from the valve-controlled line passing into and through plug and stem bores, 81 and 71 respectively. Replacement, such as reverse-acting, gates do not normally have to be provided for use with this actuator. Assume further that an operative source of pilot fluid is connected to inlet 120, and such motivating fluid is provided through such inlet. An upward force would be exerted against piston 50, equal to the pilot pressure times the area of the under surface of such piston. This would tend to move the piston, along with stem 40, T-head plug 80 and its linked gate upwardly, until piston 50 abuts plate 27. A further force opposes upwardly motion of piston 50. Line pressure, after passing through bores 81, 71 and 76, exerts a downward pressure on the upper surface of piston 110, which piston, like member 50, is fixed to stem 40. This force equals line pressure Lp times the area $A_1$ of such piston surface, line pressure forces tending to open the valve are $L_pA_2$ plus $L^pA_3$. The dimension of piston 113 is such that with any line pressure, $LpA_1 > L_pA_2 + L_pA_3$, so that the resultant force causes valve closure if pilot pressure is removed or sufficiently curtailed.

Therefore, it is seen that pistons 50 and 110, and the pressures acting thereagainst cause valve opening or closing. In order to assure valve closure, such as in the event of a pilot pressure failure, line pressure must assure valve closure, i.e., this represents an unbalanced system. Pilot pressure available normally remains substantially constant throughout the life of an actuator, and the force of such pilot pressure against piston 50 approximates 2 $L_pA_1$. However, line pressure connected to a producing well, for example, tends to decrease during the life of such well. Previously, when such pressure decrease became substantial, entire actuators had to be substituted. In this device, an increased diameter piston 110 may be substituted, along with a reduced size sleeve 118, to effectively increase the line pressure surface area and thereby increase the force tending to effect valve closure, thereby compensating for such decreased line pressure at much lesser expense to a user. Further, applicants actuator may be used with standard direct acting gates, rather than requiring the installation of reverse acting gates, again at a cost savings to the user.

Additionally, the bonnet portion, and the related operative parts, such as the variably sized piston and sleeves, may have utilization with other than a pilot-controlled pressure cylinder. For example, with manually controlled rising stem actuators, applicant's device, by virtue of the controlled force acting against piston 110, from the line, may be periodically modified so as to retain a pressure imbalanced system, as desired.

Although only a single embodiment is depicted, it should be obvious that numerous modifications would be possible by one skilled in the art without departing from the spirit of the invention, the scope of which is intended to be limited only by the following appended claims.

I claim:

1. In a pressure imbalanced gate valve actuator, the combination of:
   a housing having a piston chamber therein;
   a stem reciprocatably positioned centrally of said housing;
   said stem having one end adapted to be affixed to a valve gate for controlling the flow of liquid in a line;

a first piston, having a pressure receiving surface, affixed to said stem within said first piston chamber;

means for directing a pilot fluid against said first piston pressure receiving surface in a direction tending to cause said gate to open said valve;

a bonnet member linked to said housing, said bonnet having a further piston chamber therein bounded by upper and lower walls as well as by the interior diameter of said bonnet said upper and lower bonnet walls each having apertured means and fluid tight seals for reciprocatingly receiving a portion of said stem intermediate said first piston and said stem's one end;

a further piston affixed to said stem within said further piston chamber, said further piston also including a pressure receiving surface;

means for causing said actuator to be imbalanced when said valve is both open and closed, said causing means including a line fluid passageway through said stem from said one end to a stem exit opening adjacent said further piston pressure receiving surface; and said further piston is of sufficient diameter such that the biasing force exerted against it by said line fluid tending to close said gate, it at all times, including when said gate is open and closed, greater than the force exerted by said fluid tending to cause said stem to move said gate to an open position.

2. The actuator of claim 1, and, in addition, means for varying the biasing force exerted by said line fluid whereby said biasing force may be kept relatively stable notwithstanding decreases in line pressure.

3. The actuator of claim 2, wherein said varying means includes means for concurrently varying the internal diameter of said further piston chamber and the external diameter of said further piston means.

4. The actuator of claim 1, said bonnet member including means for venting to atmosphere, fluid leaking from said further piston chamber.

* * * * *